H. KNIGHT AND C. A. BREWER.
PROCESS OF AND APPARATUS FOR SOIL TREATMENT.
APPLICATION FILED JAN. 5, 1921.
1,424,728.
Patented Aug. 1, 1922.
4 SHEETS—SHEET 1.
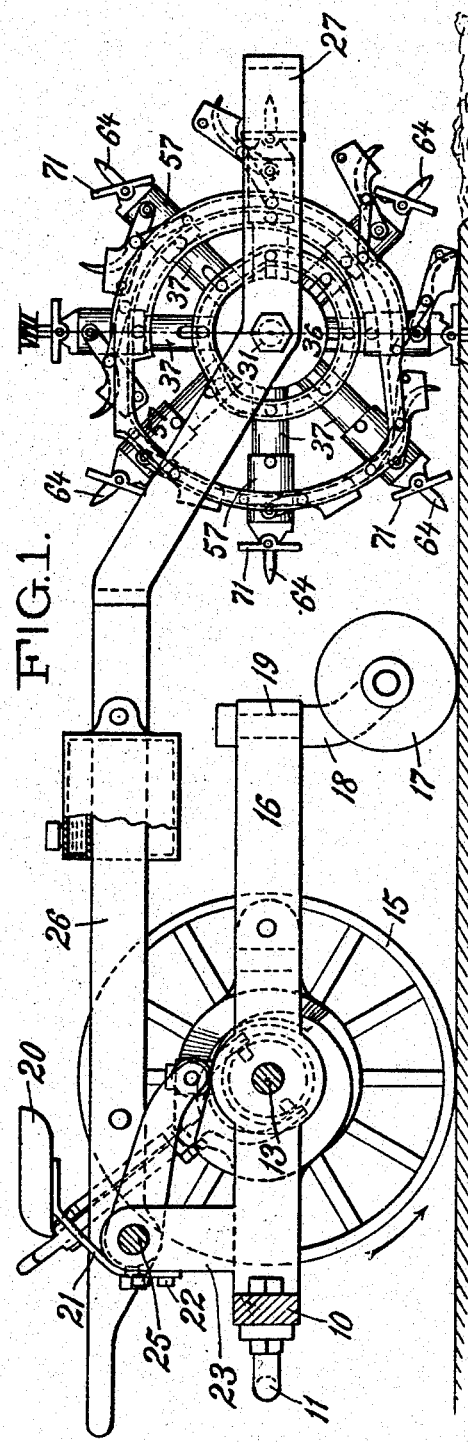
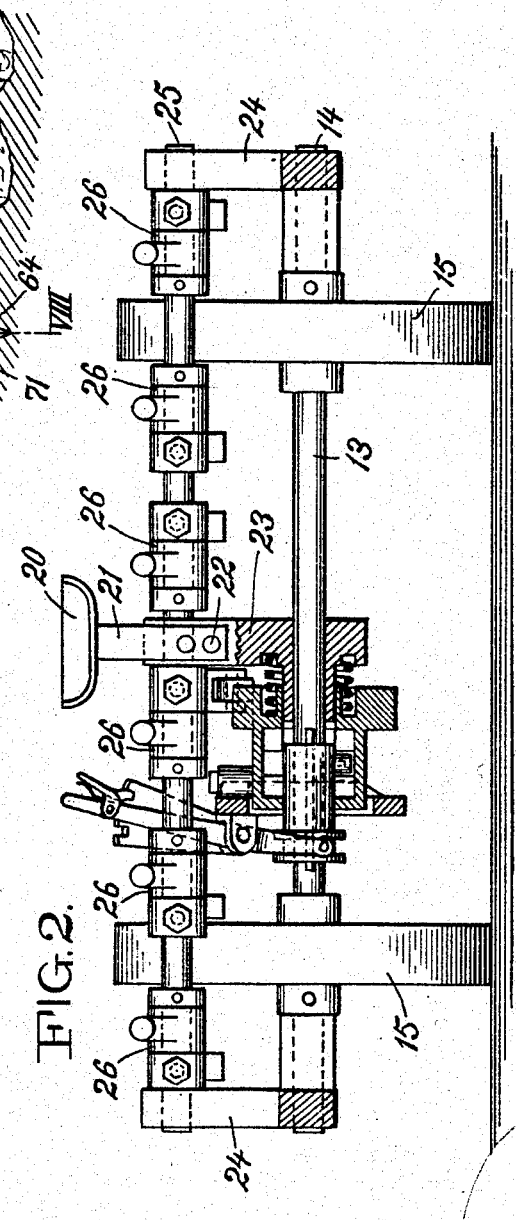

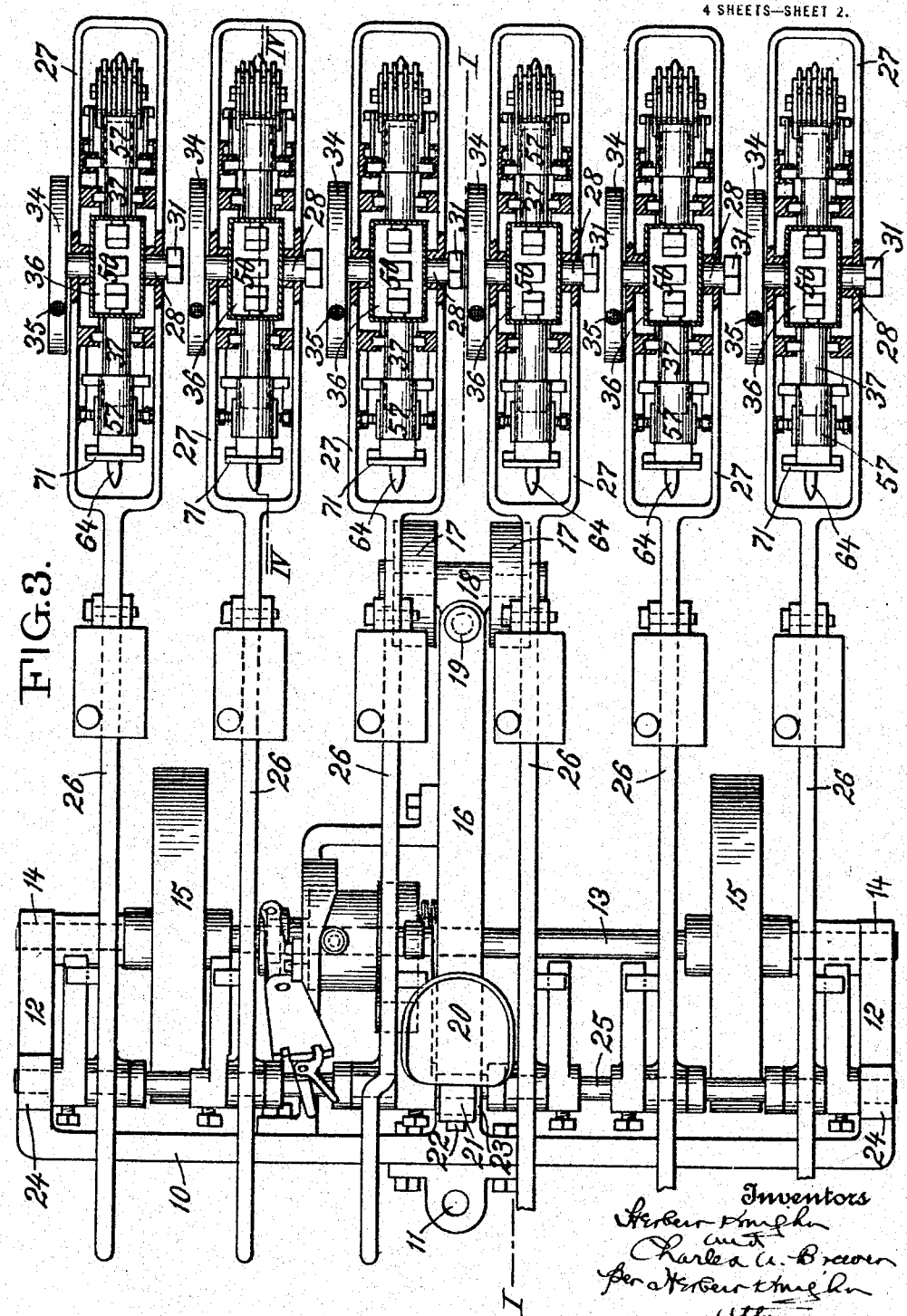

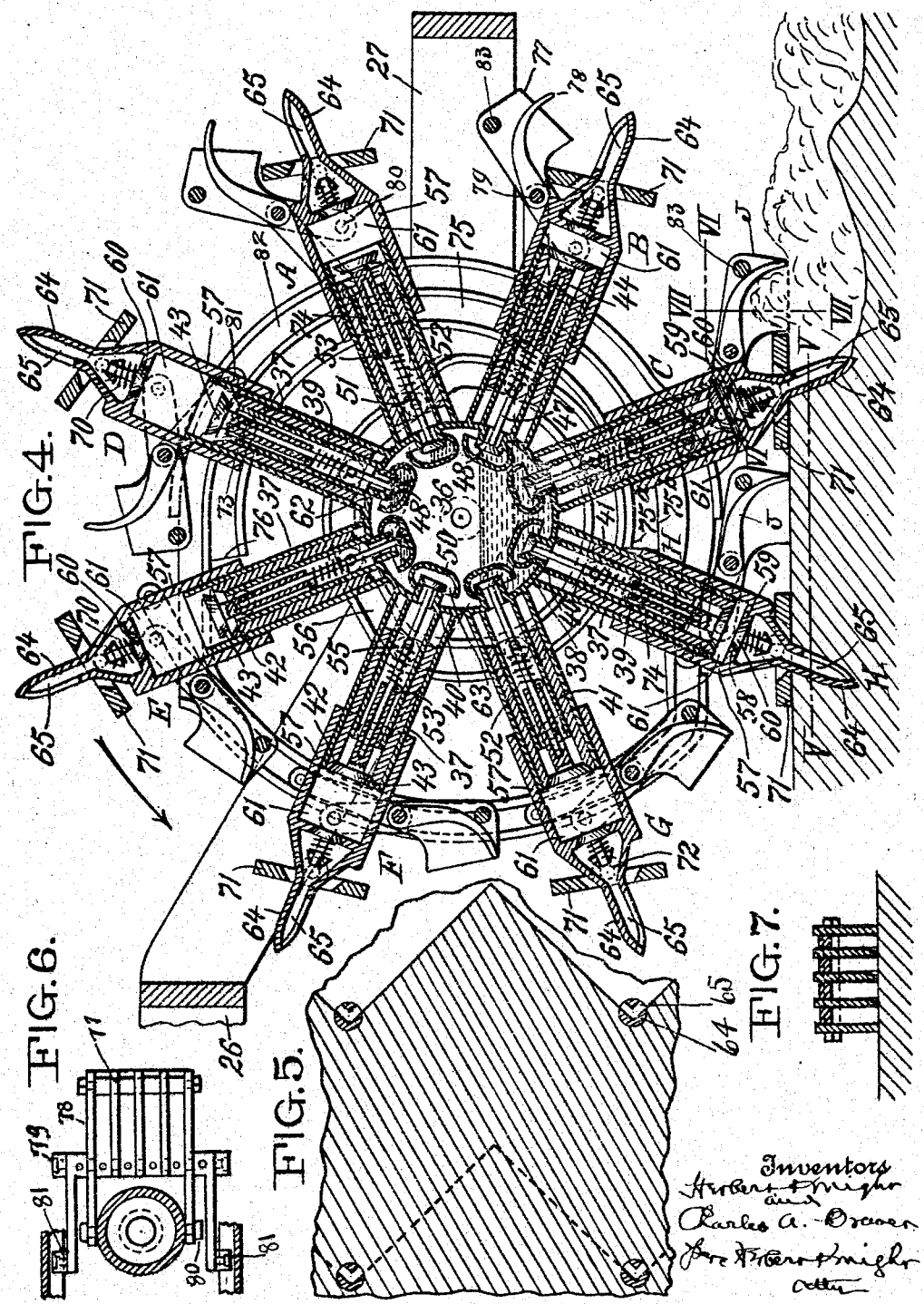

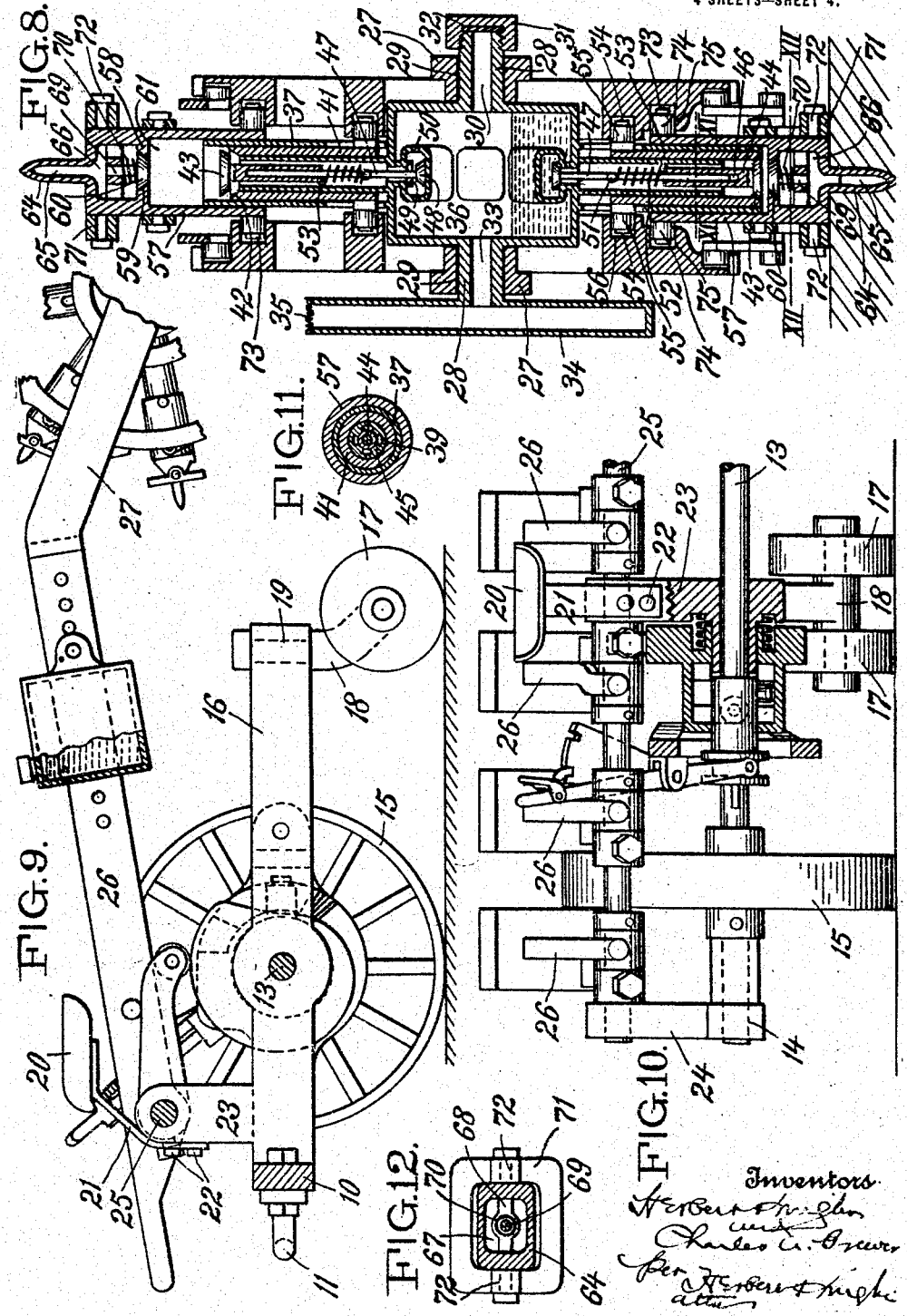

UNITED STATES PATENT OFFICE.

HERBERT KNIGHT, OF NEW YORK, N. Y., AND CHARLES A. BREWER, OF NOROTON HEIGHTS, CONNECTICUT; SAID BREWER ASSIGNOR TO SAID KNIGHT.

PROCESS OF AND APPARATUS FOR SOIL TREATMENT.

1,424,728.  Specification of Letters Patent.  Patented Aug. 1, 1922.

Application filed January 5, 1921. Serial No. 435,051.

*To all whom it may concern:*

Be it known that we, HERBERT KNIGHT and CHARLES A. BREWER, citizens of the United States of America, and residing, respectively, in the borough of Manhattan, city of New York, county and State of New York, and Noroton Heights, county of Fairfield, and State of Connecticut, have invented a new and useful Process of and Apparatus for Soil Treatment, of which the following is a specification.

The present invention is designed as an improvement upon the machine shown, described and claimed in an application filed Oct. 10th, 1913 by the above applicant HERBERT KNIGHT which application was serially numbered 794,384 and which said application was re-filed June 18th, 1919, Serial Number 305,173; the patent was issued Nov. 16, 1920 and numbered 1,359,177.

In the above application a device was shown employing a cartridge containing explosive material with means for functioning the cartridge at regular intervals beneath the surface of the soil; in the present case we employ gasoline, or some other gas expanding fluid, for carrying the invention into effect, and in order to accomplish our purpose have devised a machine which is the subject of this application.

Referring to the accompanying drawings which form part of this specification Fig. 1 is a longitudinal section approximately on the line I—I Fig. 3.

Fig. 2 is a front elevation partly in section.

Fig. 3 is a plan view of the machine, also partly in section.

Fig. 4 is a central sectional view on the line IV—IV Fig. 3.

Fig. 5 is a diagrammatic representation of the condition of the soil, and the soil breaking parts, drawn on the line V—V Fig. 4.

Fig. 6 is a detail view partly in section of the baffle device; drawn approximately on line VI—VI Fig. 4.

Fig. 7 is a sectional view of the same device on the line VII—VII Fig. 4.

Fig. 8 is a transverse section on the line VIII—VIII Fig. 1.

Fig. 9 shows the explosive carrying wheels in an elevated position; this elevated position is brought about by the action of the traction wheels.

Fig. 10 is a front view, partly in section, of the machine in the position shown in Fig. 9.

Figs. 11 and 12 are detail views.

In these drawings 10 is the forward end of the frame of the implement with a hitching place at 11. The end bar 10 is provided with rear extensions 12, one on each side, and the inner ends of these extensions 12 are mounted on the main shaft 13 at points 14.

The main supporting wheels are shown at 15, also mounted on the main shaft 13.

Centrally positioned in respect to the implement is rearwardly extending tongue 16 having casters 17, which latter are mounted in frame 18 and are swiveled at 19 to turn in the tongue 16. These casters 17 supplement the main wheels 15 as supporting instrumentalities, and the pintle 19 enables them to turn and accommodate themselves to the course of the vehicle. The implement is preferably provided with a seat, centrally located as shown at 20, mounted in the forward part of the implement and directly in the rear of the connecting hook.

A spring metal support extending downwardly therefrom is shown at 21 which latter is secured by means of bolts 22 to the central support or standard 23; other standards and supports are shown at 24. These latter two are located at the side. Supported upon these standards and extending through same is a shaft 25 which latter carries the forward end of the explosive carrier frame 26; in fact the said frame 26 and the said shaft are secured fixedly to each other so that when the shaft turns the frame is elevated, or depressed.

The frame 26 may be a single frame, or it may be a double frame, or there may be a plurality of them, and we have shown and described in the specification and drawings a plurality of frames, six in number; it is the intent and purpose of this invention to so engineer the implement that each of these frames with its parts can be considered a separable unit and each can be subtracted from the structure or added thereto in lateral formation and as occasion requires; we have thus produced and secured an implement of wide flexibility and capable of wide and varied use; that is to say, it can be employed in large and small operations with equal advantage, all depending upon the number of units employed.

At the rear end of each frame 26 is a supplementary frame 27. This supplementary frame has four sides, preferably as shown in Fig. 3; included within each said frame are the working parts of each unit and each frame with its enclosed unit is, as shown in Fig. 3, absolutely independent of its neighboring units, and can be thrown out of commission, or put back, without in any way impairing the usefulness of its neighboring units; in this way if a local obstruction is met by any particular unit, such unit accommodates itself to the situation without in any way impairing the operativeness of any of the others.

The tillage unit consists of a rotary member embodying a central shaft 28 mounted in journals 29 of the frame 27. At 30 is shown an inlet for the introduction of gasoline, or other suitable fluid explosive agent, which agent constitutes the means for breaking the soil by direct blow and action, which activity is brought about through the manipulation and operation of this implement, as will hereinafter be fully described. At 31 is a cap covering the outer end of this opening and at 32 is a suitable air, or dust-tight, packing.

At the other end of this shaft is a similar channel 33, which affords means of entrance for the atmospheric air, the outer end of this channel being provided with a cylindrical air container 34 rotating with the rotating part, and it is provided at 35 with an air sifting screen, so that the air which is introduced will be practically clean and free from dust.

Centrally positioned in respect to the tillage unit and at the inner ends of the channels 30 and 33 is a reservoir 36, this latter being cylindrical in form, see Fig. 4; it is the central part and constitutes part of the hub of the tillage unit. This reservoir is adapted to receive the expansive fluid agent through the channel 30 and is shown in Figures 4 and 8. The fluid is maintained at a level somewhat below the center of the reservoir; in fact it is preferably maintained at about one-third full and of course sufficiently below the channels 30 and 33 so as not to discharge into either of these channels at any time.

This central reservoir is adapted to feed its contents to the tillage instrumentalities which are as shown in Figures 1 and 4; these are eight in number, and are positioned at an equal distance in respect to said reservoir.

At 37 is shown a plunger sleeve secured at its inner edge at 38 to the reservoir structure, and at 39 is shown a similar sleeve smaller in diameter, also fixed at its inner end to the reservoir structure at 40.

The smaller sleeve 39 is centrally positioned in the larger sleeve 37 and between these sleeves is an annular space in which is adapted to travel a sliding valve seat sleeve 41. Said valve seat sleeve fits snugly in said channel having at 42 a valve seat which is constructed to accommodate the valve 43. This latter has a hollow stem 44 extending for some distance into the sleeve 39 being supported laterally in said sleeve by the ribs 45 upon the interior of the sleeve see Fig. 11. In the hollow space 46 of the stem 44 is placed the valve shank 47, which has at its inner end a valve 48 adapted to seat on the valve seat 49 of the fuel measuring buckets 50. The valve shank 47 is provided with a pin 51 to which is secured one end of a spring 52, the outer end of said spring being fastened at 53 to the hollow stem 44. This construction operates normally to draw the two valves towards each other. The valve bearing sleeve 41 is provided, see Fig. 8, with outwardly extending pins 54 on which are mounted rollers 55, and these rollers are adapted to travel in guides 56, which are mounted upon the frame 27 of the unit and are rigidly secured thereto. The object and purpose of this arrangement is that, as the unit rotates, this roller traveling in the guides 56, said guides being in form of an eccentric, will cause the said valve bearing sleeve 41 to move up and down as the instrument requires and as will be hereinafter explained.

It is to be understood that the valve bearing sleeve 41 and the valve 43 which co-ordinates with the seat 42 and the member 41 are both floating parts, that is to say, nearly all the parts of the machine are fixed relatively to the tillage unit, but both these two move back and forth as required.

At 57 is shown a compression cylinder which is fitted over the outer end of the sleeve 37 and it is provided with a diaphragm 58 having a valve seat 59 operating in connection with the valve 60. The walls of the cylinder are adapted to slide up and down on the sleeve 37. Between the diaphragm 58 and the lower end of the sleeve structure is a chamber 61, and this chamber will be referred to herein as the compression and expansion chamber. When the sleeve structure is moving down and the outer end thereof is closed by the valve it tends to compress the gases which have been admitted thereto, said chamber having previously acted as a suction chamber when the gases rush in, as will be explained.

Reference has been made to the fuel buckets 50. These buckets are mounted on the extension 62 of the reservoir chamber and are provided with an opening 63, which acts as a receiving means and means for measuring and discharging the correct quantity of fuel to the chamber 61 as the unit moves around in the direction of the arrow see Fig. 4; this is accomplished as follows; the bucket, through the agency of the opening aforesaid, picks up the fuel in measured quantity and carries it upward into the upper part of the air space so that as these buckets are approaching the upper part of the reservoir they are partly filled with fuel; as the plunger member reaches the position shown at the point "A", see Fig. 4, the fuel bucket has been lifted out of the liquid in the reservoir and is approaching a position where it is ready to have this fuel withdrawn from the bucket during which operation the air from the outside will be also drawn or sucked in through the opening 35 to chamber 36.

It will be noted that as the unit progresses from the position shown at "A", the expansion chamber 61 is increasing in size and at "D" is fully extended, and when the parts have reached this position the valve 48 is opened and the suction chamber 61 being now a partial vacuum the situation will be such that the fuel will be drawn into the chamber 61 passing the aforesaid valve and entering the inner sleeve 39, and passing the valve 43 into the chamber 61. The air rushes from the chamber 34 into channel 33 and follows the path of the fuel at the same time, so that the fuel in an exploding state will reach the compression chamber 61 at the right time and in the proper proportions. From this point it is the object of the invention to close the valve 43 and bring it back on its seat 42 which action takes place at the time the parts have reached the position shown at "F", and this action is caused by the roller 55 traveling in the guides 56 mounting up at the point "F" in the guides 56, thus drawing the valve carrying sleeve up against the valve 43; the valves are now placed and ready for operation.

At 64 is shown one of a series of forks which are hollowed out, providing channels 65, which agents are connected with the chambers 66, the chambers 66 receive the exploded gases from the chambers 61; from there the exploded gases proceed outwardly and enter the channels 65, passing through the openings 67 of the grid 68; see Fig. 12: the valve has a stem 69 and a spring 70 bearing against the grid at its upper surface and pushing the valve 60 into position. This spring must have tension enough to resist the force of the compression in the chamber 61 but must yield to the explosive pressure.

At 71 are plates pivoted to the forks 64 at 72; as the unit moves around upon the surface of the soil the weight of the apparatus operates to compress the gases in the chamber 61 to a pressure sufficient to cause ignition of the compressed charge. This is followed by explosion of the charge, the opening 65 permitting the resultant gases to impact against the soil thus shattering it and throwing it up against the baffle at J; see position C Fig. 4.

Baffle "J" consists of two sets of bars 77 and 78 mounted on shaft 79 and free to oscillate thereon.

Bars 77 are pivoted at pivot 80. Bars 78 are pivoted to rollers 81 which are adapted to travel in cam groove 82. Rod 83 serves as a stop for bars 78.

In the forward movement of the vehicle, rollers 81 travel in cam groove 82 from "C" to "B" bringing bars 78 into position as shown at B thereby removing any accumulated soil from the baffle J.

Mounted upon the cylinder 57 are pins 73 having rollers 74, which travel in guides 75 upon the frame 27 and which serve the purpose of returning the said cylinders to their normal position; it also serves to lock the parts together when the explosion takes place. Referring to position "C" Fig. 4 the explosion has just taken place and the soil has been shattered and is being thrown upwardly against the baffle J. This action is caused by the gases rushing out of the compression chamber 61 having been ignited by the heat generated from the compression of the air and gases; it is necessary to maintain the sliding parts in position so that the valve carrying sleeve will not fall in the direction of the movement of the gases and for this purpose the roller 74, one on each side, and the roller 55, one on each side, serve to lock all the parts temporarily together; the walls of the groove 75 are shown at 75$^a$ and 75$^b$.

It will be observed that as the tillage unit is rotating in the direction of arrow Fig. 4 and as the explosive units are passing from position "H" to position "C" rollers 74 enter the guides 75 at the point 75$^a$—75$^b$ substantially midway between "H" and "C", and at the top of the unit they leave these guides at the point 76, at which point the guides 75, for the time being, discontinue.

The mode of operation of this machine is as follows: it will be observed in the first place that this is an implement which is drawn by means of an agency separate from, but connected to it, and that the machine does not depend upon its traction for its propulsion, its office being to function as a soil treating unit to eliminate the necessity of what is ordinarily known as plowing and also, what is ordinarily known as harrowing, as it can be readily seen that not only will this implement shift the soil by throwing it up and permitting it to descend in place again thereby forming a substitute for an ordinary plow, but by the same operation pulverizes the soil thereby constituting a substitute for the harrow; in other words both of these forms of operation are now consolidated into a single operation. The structure has hereinbefore been carefully described and it remains to be explained somewhat further the functioning of the parts to achieve the results aforesaid.

As the instrument moves forward along the top of the soil in the direction of the arrow Fig. 4 the prongs 64 enter the soil successively; see position H Fig. 4. The plate 71 comes down on the top of the soil acting as a shoe to prevent the associated soil penetrating unit from entering the soil beyond the lower face of the shoe, and it therefore carries the weight of the vehicle at that point, and, by carrying the weight, forces the cylinder 57 upwardly and compresses the gas in the chamber 61 to the ignition point causing, upon the ignition, the explosion of the gas; and this act causes the valve 60 to open and permit the gases to rush out and escape through 65; these operations take place while the unit is traveling from position H to position C; where the compression becomes sufficient to cause ignition followed by the explosion with the resultant shattering of the soil.

After the parts have passed the position C they will resume their position as shown at B and are prepared to function again. When the explosion takes place it blows up a section of ground as indicated in Fig. 5.

As will be seen from all the foregoing, the virtue and potency of this system springs not from the mere pressure of the gases but from the blow caused by the explosions; that is to say, from the sudden and violent action of the functioning element and the prompt, and in fact the immediate, delivery of the results of each explosion beneath the surface of the soil; for this reason we bring the explosive cylinder down as close to the soil as possible in other words proximity of the cylinder and the speed of the delivery of the shock, or blow, insure the requisite promptness for the sudden and complete shattering of the soil.

It will also be seen that we have devised and perfected an apparatus or organization which functions an explosive and simultaneously presents a prong or dibble at that point in the soil which is best adapted to discharge the office of this invention; in Fig. 4 position C the explosion has just functioned, in other words, the explosion, and the proper position of the prong, or dibble, may be said to register.

It is to be understood however that any discharge through the prongs, dibbles, or other suitable instruments of introduction, which proceeds therethrough in a flowing state and leaves such instruments with the requisite force to shake and break the soil, comes under the scope of our present invention.

We claim:

1. The process of soil treatment consisting in progressively and periodically introducing an explosive fluid in an expanding state beneath the surface and with the requisite suddenness to shatter the soil.

2. The process of soil treatment consisting in progressively functioning an explosive fluid and introducing the resultant gases in an expanding state beneath the surface and with the requisite promptness to insure the shattering of the soil.

3. The art of agriculture consisting in progressively treating the soil during an uninterrupted transversing movement by functioning an explosive fluid above the top of the soil surface and then introducing the resultant gases of each explosion separately and at regularly spaced distances beneath the surface of the soil and with the requisite promptness to insure the sudden shattering of the soil.

4. A soil treating organization embodying a hollow soil penetrating member, a container for holding an explosive fluid, and means for periodically introducing the fluid in an expanding state through the penetrating member and with the requisite suddenness to shatter the soil.

5. An apparatus for treating the soil embodying a suitable vehicle, a hollow soil penetrating member, a container carried by said vehicle for holding an explosive fluid, means for withdrawing the fluid in stated quantities and introducing same into an explosive unit, means for functioning the explosive unit and means for directing the results of the explosion through the soil penetrating member into the soil.

6. An apparatus for treating the soil embodying a vehicle having a rotary member with hollow soil penetrating prongs or dibble upon its periphery, a reservoir for carrying an explosive fluid, means for functioning said fluid and causing periodic explosions and means for directing the products of such periodic explosions through the prongs into the soil.

7. An apparatus for treating the soil embodying a suitable vehicle having a continuously rotating member, gas discharge prongs on the periphery of said member for periodically penetrating the soil, an explosive fluid carried by said member, means for causing periodic explosions to correspond with the periodic penetration of the soil by the prongs and means for directing the functioned gases through the prongs when successively positioned in the soil.

8. An apparatus for treating the soil embodying a suitable vehicle having a member carrying means for penetrating the soil, a reservoir for an explosive fluid, means for withdrawing the fluid in measured quantities and sucking it together with atmospheric air into a suitable chamber, means for compressing, igniting and exploding this mixture and means for promptly delivering the results of these explosions through the soil penetrating members into and beneath the surface of the soil.

9. In a soil treating organization, the combination of a rotary member having hollow peripheral dibbles, a suitably positioned reservoir containing an explosive fluid, and means for functioning the fluid so as to periodically shatter the soil as each dibble reaches a pre-determined position.

10. An apparatus for treating the soil embodying a vehicle having a rotary member with hollow soil penetrating prongs or dibbles upon its periphery, a reservoir for carrying an explosive fluid, means for functioning said fluid and causing periodic explosions, means for shattering and blowing up the soil by directing the products of such periodic explosions through the prongs into the soil, and baffles.

11. An apparatus for treating the soil embodying a vehicle having means for shattering and blowing up the soil and baffles supported by the apparatus at points to the rear of said means to receive the impact of the soil.

12. An apparatus for treating the soil embodying a vehicle having a rotary member with hollow soil penetrating prongs or dibbles upon its periphery, a reservoir for carrying an explosive fluid, means for functioning said fluid and causing periodic explosions, means for shattering and blowing up the soil by directing the products of such periodic explosions through the prongs into the soil, and baffles positioned and supported at the rear of the prongs to receive the impact of the soil.

13. The process of treating the soil which consists in progressively introducing thereunder an expandible, soil shattering charge in a flowing state.

14. The process of soil treatment consisting in progressively introducing a soil shattering fluid beneath the soil surface.

15. The art of agriculture which consists in progressively treating the soil and rendering it fit for the reception of the seed by shaking and breaking it with an expanding fluid and then planting the seed in the same traverse.

16. An apparatus for treating the soil embodying a suitable vehicle, a container for holding expandible, soil shattering charges, and means for continuously and automatically discharging these charges in a flowing state into, and beneath, the soil surface.

17. The art of agriculture consisting in progressively treating the soil during a traversing movement by functioning an explosive substance exterior to the soil and then introducing the resultant gases of each explosion separately beneath the soil and with the requisite promptness to shake and break the soil.

HERBERT KNIGHT.
CHAS. A. BREWER.